United States Patent [19]

Muller

[11] Patent Number: 5,009,793

[45] Date of Patent: Apr. 23, 1991

[54] PROCESS FOR THE SEPARATION OF HEAVY METALS FROM WASTE MATERIALS

[75] Inventor: German Muller, Bammental, Fed. Rep. of Germany

[73] Assignee: Industrie Automation Sondertechnik GmbH & Co., Heidelberg, Fed. Rep. of Germany

[21] Appl. No.: 462,580

[22] Filed: Jan. 9, 1990

[30] Foreign Application Priority Data

Jan. 13, 1989 [EP] European Pat. Off. ........ 89100518.3

[51] Int. Cl.$^5$ .............................. C02F 1/52; C02F 1/72
[52] U.S. Cl. .................................... 210/710; 210/717; 210/721; 210/722; 210/724; 210/726; 210/912; 210/913; 423/43; 423/50; 423/55; 423/92; 423/105; 423/140; 423/419 R
[58] Field of Search .............. 210/702, 717, 721, 722, 210/724, 752, 758, 759, 912, 913, 726, 710; 423/92, 43, 55, 105, 144, 419 R, 50, 140

[56] References Cited

U.S. PATENT DOCUMENTS

| | | | |
|---|---|---|---|
| 3,800,024 | 3/1974 | Forsell et al. | 210/726 |
| 4,018,680 | 4/1977 | Kupfer | 210/726 |
| 4,025,430 | 5/1977 | Pagel | 210/912 |
| 4,321,149 | 3/1982 | Hawxhurst et al. | 210/720 |
| 4,338,200 | 7/1982 | Zeijlstra | 210/724 |
| 4,419,246 | 12/1983 | Jayawant | 210/721 |
| 4,680,126 | 7/1987 | Frankard et al. | 210/724 |

FOREIGN PATENT DOCUMENTS

| | | | |
|---|---|---|---|
| 5135553 | 9/1974 | Japan | 210/912 |
| 53115557 | 2/1977 | Japan | 210/912 |

Primary Examiner—Peter Hruskoci
Assistant Examiner—Krisanne Shideler
Attorney, Agent, or Firm—Hoffman & Baron

[57] ABSTRACT

A process for the heavy-metal decontamination of contaminated substances such as natural and industrial sludges, thermal residues and soils. The contaminated starting substance is treated with an acid and the dissolved metal salts are precipitated as metal hydroxides in the pH range of about 3.5–11. The exact control of the pH value makes it possible to isolate individual metal fractions which can be used as raw materials in the metallurgical industry.

21 Claims, 11 Drawing Sheets

COPPER. 30 min. With 0.8% $H_2O_2$

□ Without $H_2O_2$
X With $H_2O_2$

PROCESS FOR THE SEPARATION OF HEAVY METALS FROM WASTE MATERIALS

The present invention is directed to a process for the separation of heavy metals from mixtures and, more particularly, for the separation of heavy metals from waste materials such as natural and industrial sludges, thermal residues and contaminated soils.

BACKGROUND

One process for the heavy-metal decontamination of river and harbour sludges, sewage sludges, residues of combustion and pyrolysis, and other relevant problem substances is disclosed in European Patent Specification 0,072,885. The heavy metals are dissolved with mineral acids and then precipitated again as hydroxides with milk of lime at a pH of about 10. The hydroxides are then carbonated by carbon dioxide and the metals still remaining are extracted down to trace amounts. The decontaminated starting substances can then be put to an economically viable use. For example, river and harbour sludges, as well as decontaminated residues of combustion and pyrolysis, may be used for the production of bricks, light-weight building materials or cement building materials. Decontaminated sewage sludges can be used as fertilizers. In each of these cases, problem-free disposal is possible.

The heavy-metal hydroxides and carbonates obtained in the decontamination are themselves valuable raw materials. It would therefore be desirable to separate these valuable raw materials. However, since these heavy metals typically have a high iron content, e.g. 90% of the total metal content, the use of these raw materials is inhibited. Recycling the valuable nonferrous heavy metals is therefore of little interest, particularly at times when there is an inexpensive surplus of metal ores and scrap metal on the world market.

One process disclosed in the above-referenced European Patent Specification teaches to first precipitate the bulk of the iron together with some of the heavy metals at pH 7 and then to precipitate the remaining heavy metals at pH 10. The iron fraction obtained according to this process and the heavy metal fraction precipitated at a higher pH value, however, both consist predominantly of iron and, therefore, cannot be readily used as raw materials in the metallurgical industry.

The heavy-metal hydroxide/carbonate mixtures precipitated using known decontamination processes must, therefore, be largely disposed of as expensive and undesirable "special waste", i.e. as waste material which cannot be eliminated safely with normal domestic and commercial refuse.

While various processes are known for the separation of heavy metals, e.g. sulphide separation process, separation by complexing, and separation by ion exchange, such separation processes for heavy metals have significant drawbacks. Either the costs of the chemicals or equipment are too high, or the separation processes are not sufficiently specific. The sulphide separation process would certainly make good separation possible but, due to environmental reasons, it is almost impossible to implement today and entails high investment costs for the necessary safety measures.

In practice, therefore, there is a need for simple, cost-effective and technologically viable ways of separating the iron, if possible quantitatively, from the remaining heavy metals and also of separating the heavy metals from each other individually or at least in groups so that they become economically viable raw materials for the metallurgical industry.

SUMMARY OF THE INVENTION

The present invention provides a process for the separation of heavy metals from a contaminated starting material wherein the starting material is first treated with acid to dissolve the heavy metals as water-soluble salts. The heavy metals are then precipitated as hydroxides under careful pH control. According to one embodiment of the present invention, the solution containing the metal salt is treated with an oxidizing agent.

DETAILED DESCRIPTION

The present invention utilizes the discovery that metal residues can be separated selectively as metal hydroxides by fractional precipitation of the metal salts at different pH values. Surprisingly, this separation succeeds at acidic pH values. Equally surprising and previously unknown is the fact that the different metal salts exhibit greatly divergent precipitation behaviours at different pH values. Thus, by controlling the pH during the precipitation, selective separation is possible.

According to the process of the present invention, the contaminated starting materials are initially treated with mineral acids so as to dissolve the heavy metals as water-soluble salts. The solids are separated and then the metals are re-precipitated as hydroxides by means of exact pH control. The iron/manganese fraction is preferably first separated at a pH of about 3.5. Then the other heavy metals are selectively precipitated either individually or in groups in the pH range of about 4–11, according to their pH-dependent precipitation behaviour. For example, after the separation of an iron/manganese fraction at about pH 3.5, a lead fraction can be separated at a pH of about 5, and then a nickel/chromium/cobalt/copper fraction can be separated at about pH 7.

In order to obtain a quantitative precipitation of the individual metal fractions, the precipitation of each fraction can be repeated once or several times by re-acidification and re-alkalinization at a certain pH, preferably between 3 and 4.5.

According to one preferred embodiment of the present invention, the solution containing the metal salts is treated with an oxidizing agent, at least on the separation of the iron/manganese fraction at pH 3.5. The oxidation can be carried out by any oxidizing agent. Preferred oxidizing agents are air and hydrogen peroxide. It is particularly preferred for the oxidation to take place by the introduction of air for 5 to 20 minutes or by the addition of 0.01% by weight of hydrogen peroxide The solution containing the metal salts can also be oxidized, for example, using known strong oxidizing agents. Preferred strong oxidizing agents are permanganates, such as potassium permanganate, chromates, nitric acid, chlorates, such as potassium chlorate, and ozone, but particularly hydrogen peroxide, preferable in a concentration of more than 0.5% by weight.

For most of the metals, strong oxidation results in only a slight change in the precipitation behaviour. There is, however, a marked change in the precipitation behaviour for copper, which can be separated at low pH values. Strong oxidation also has a marked effect on concentrated manganese solutions with a manganese content of greater than 70 mg/l, and results in a shift of the optimum pH value for quantitative precipitation to pH 8 and higher. This can be used, if required, to separate iron from manganese almost quantitatively.

The various hydroxides obtained selectively can be converted into metal carbonates by carbon-dioxide treatment, preferably in the pH range of 9 to 11.

BRIEF DESCRIPTION OF THE DRAWINGS

FIGS. 1 to 9 below show the precipitation behaviour of each individual metal under these pre-conditions. The FIGURES indicate the proportion of the dissolved metal which precipitates as a hydroxide as a function of the pH value. For example, lead precipitates almost completely at pH 5 (FIG. 7); 90% of the nickel, cobalt and chromium precipitate at pH 7 (FIGS. 3–5); and cadmium and zinc precipitate almost quantitatively at pH 10.5 (FIGS. 1 and 2). The FIGURES show that chemically related and geologically associated metals, such as iron and manganese or zinc and cadmium, behave in similar manners with respect to their precipitation properties.

Using the FIGURES and the following examples it is possible for one skilled in the art to concentrate individual metals or groups of metals by fractional precipitation at other determined pH values. It will thus be possible to obtain heavy-metal fractions corresponding to the wishes of the users in the field of metallurgy.

EXAMPLE 1

As the starting substance a dredger sludge from the Neckar with 33% dry substance was used. The sludge had the following heavy-metal contents, relative to the dry substance:

| iron | 1.87% |
| zinc | 650 ppm |
| manganese | 625 ppm |
| chromium | 375 ppm |
| copper | 329 ppm |
| lead | 193 ppm |
| nickel | 83 ppm |
| cadmium | 43 ppm |
| cobalt | 13 ppm |

3 kg of this sludge was diluted with water down to 25% dry substance and treated with 30% hydrochloric acid until a constant pH value of 0.5 was obtained. The solids were separated off from the solution and washed with approximately 15 times the quantity of water.

The absorption spectrum analysis showed a heavy-metal content in the acidic solution of:

| 16,700 mg | iron |
| 620 mg | manganese |
| 190 mg | lead |
| 356 mg | chromium |
| 306 mg | copper |
| 80 mg | nickel |
| 13 mg | cobalt |
| 630 mg | zinc |
| 42 mg | cadmium |

For the quantitative separation of iron/manganese, the pH was adjusted to 3.5 with a 15% milk of lime suspension under vigorous agitation and air was introduced for 10 minutes for the oxidation of the iron. A brown precipitate formed, which was filtered off by suction, washed with distilled water and dried. It contained 8407 mg of iron and 301 mg of manganese. After re-acidification and repeating 8 times in total, 3.1 mg of manganese and 73 mg of iron were still in solution. The other metals had precipitated only in quantities less than 3 mg.

EXAMPLE 2

For almost quantitative separation of the lead, the solution obtained in Example 1 was then adjusted to pH 5 with more 15% milk of lime under vigorous agitation. The precipitated metal hydroxides were filtered off, washed with distilled water and dried.

They contained:

| 186 mg | lead |
| 285 mg | chromium |
| 110 mg | cooper |
| 31 mg | nickel |
| 5 mg | cobalt |
| 378 mg | zinc |
| 2.9 mg | cadmium |

In addition, the precipitate also contained 61 mg of iron and 2.6 mg of manganese.

EXAMPLE 3

The solution obtained from Example 2 was adjusted to pH 7 with more 15% milk of lime with vigorous agitation and further treated as described in Example 2.

The following metals were analyzed in the precipitate:

| 69 mg | chromium |
| 135 mg | copper |
| 48 mg | nickel |
| 7.1 mg | cobalt |
| 239 mg | zinc |
| 22.7 mg | cadmium |

In addition, the precipitate also contained 10 mg of iron. This precipitate, as the Cr/Co/Ni/Cu fraction (with a high proportion of zinc), is a valuable raw material for heavy-metal recycling.

EXAMPLE 4

The solution remaining from Example 3 was adjusted to pH 11 and after 20 minutes treatment with carbon dioxide was further processed as described in Examples 2 and 3.

The precipitate contained:

| 59 mg | copper |
| 12 mg | zinc |
| 15.6 mg | cadmium |

EXAMPLE 5

If a model sample with 30 mg copper/l (in the form of $CuCl_2$) is treated with 0.8% hydrogen peroxide, the following results are obtained after 30 min. holding time:

| Without hydrogen peroxide amounts of metals still in solution at | |
| --- | --- |
| pH 8.1 | 10 ppm |
| pH 9.0 | 5 ppm |
| pH 9.8 | 1 ppm |

-continued

| With hydrogen peroxide amounts of metals still in solution at | |
|---|---|
| pH 4.6 | 11.4 ppm |
| pH 6.2 | 1 ppm |
| pH 8.6 | 0.1 ppm |

Figure 1:
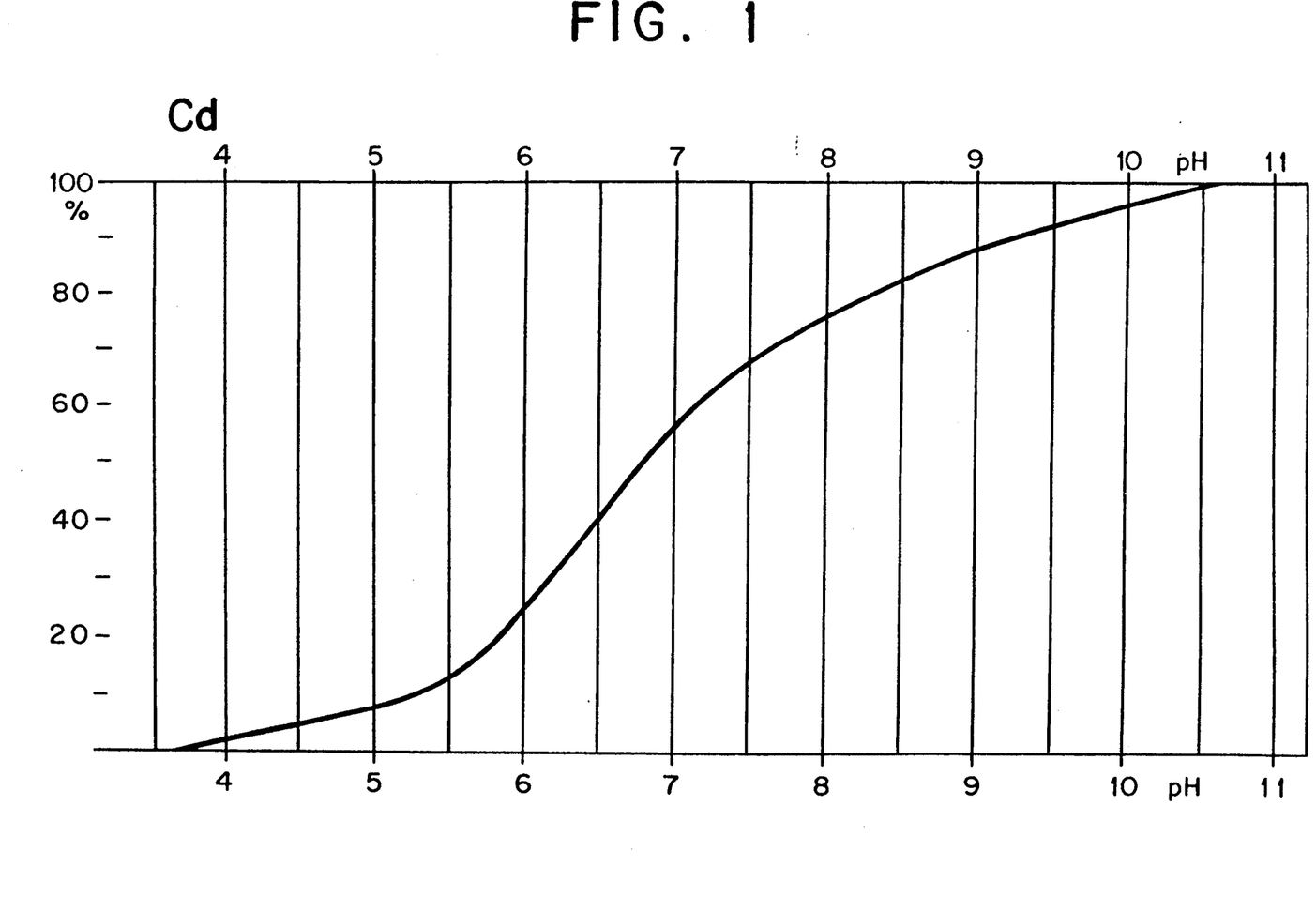
Figure 2:
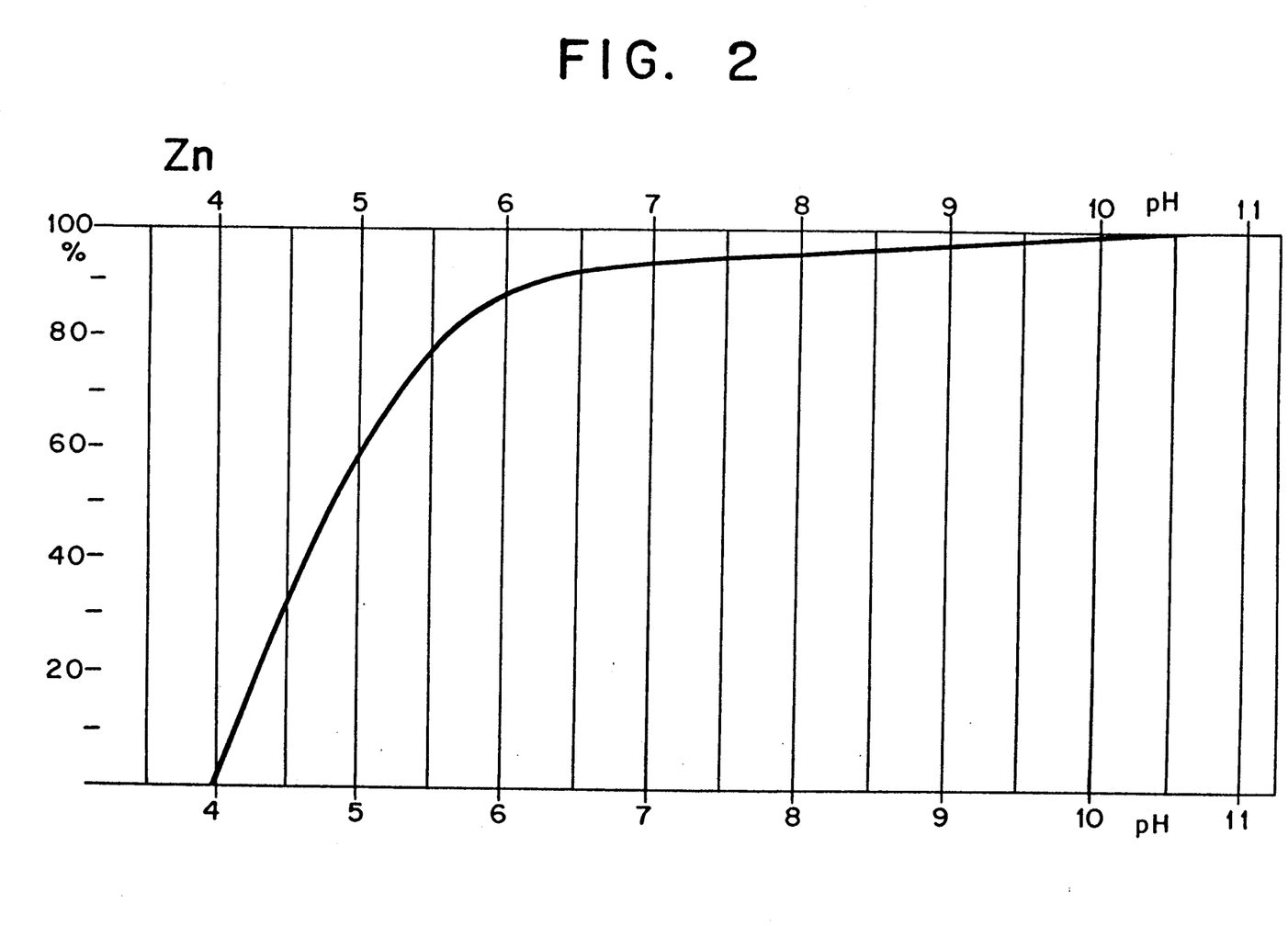
Figure 3:
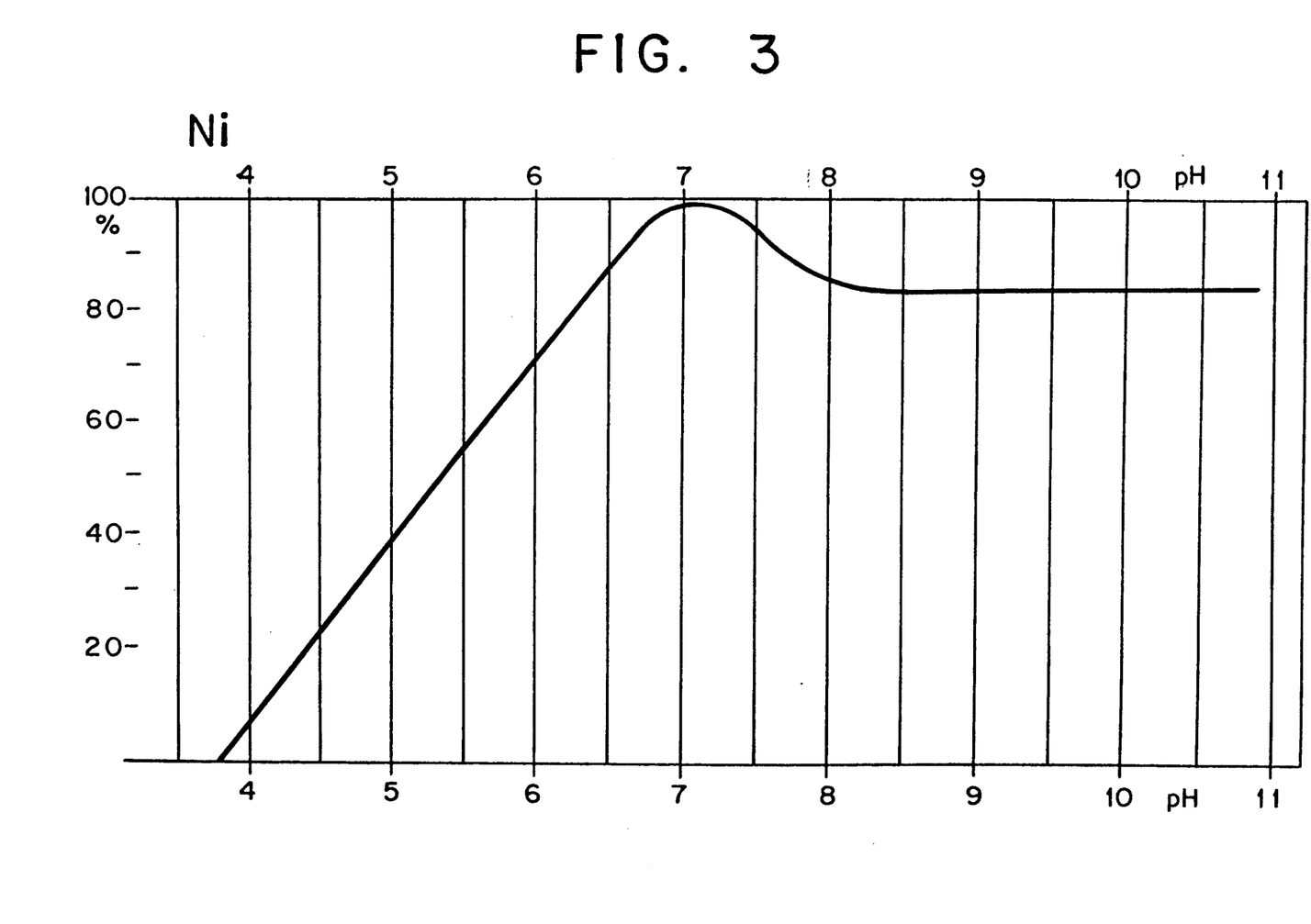
Figure 4:
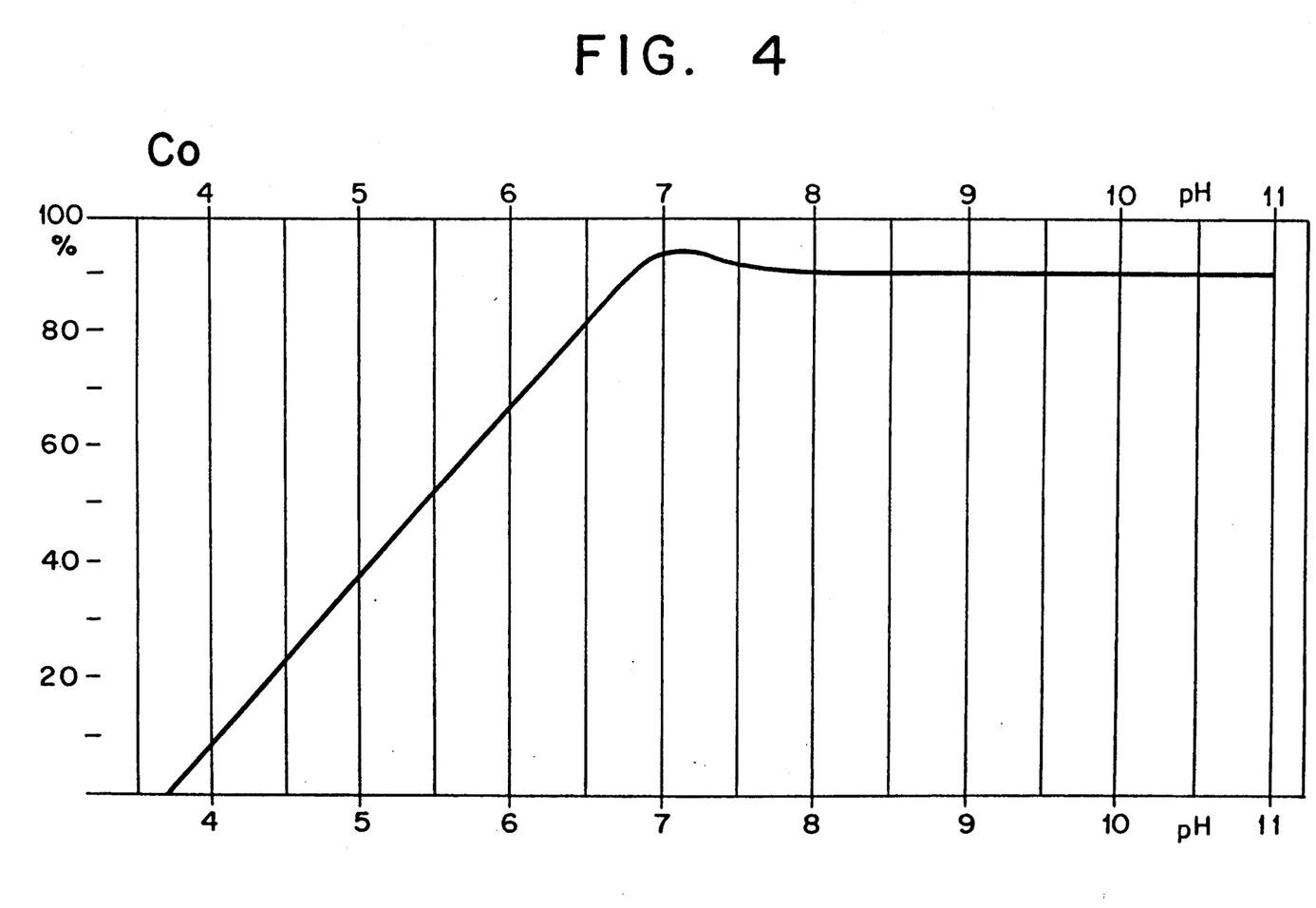
Figure 5:
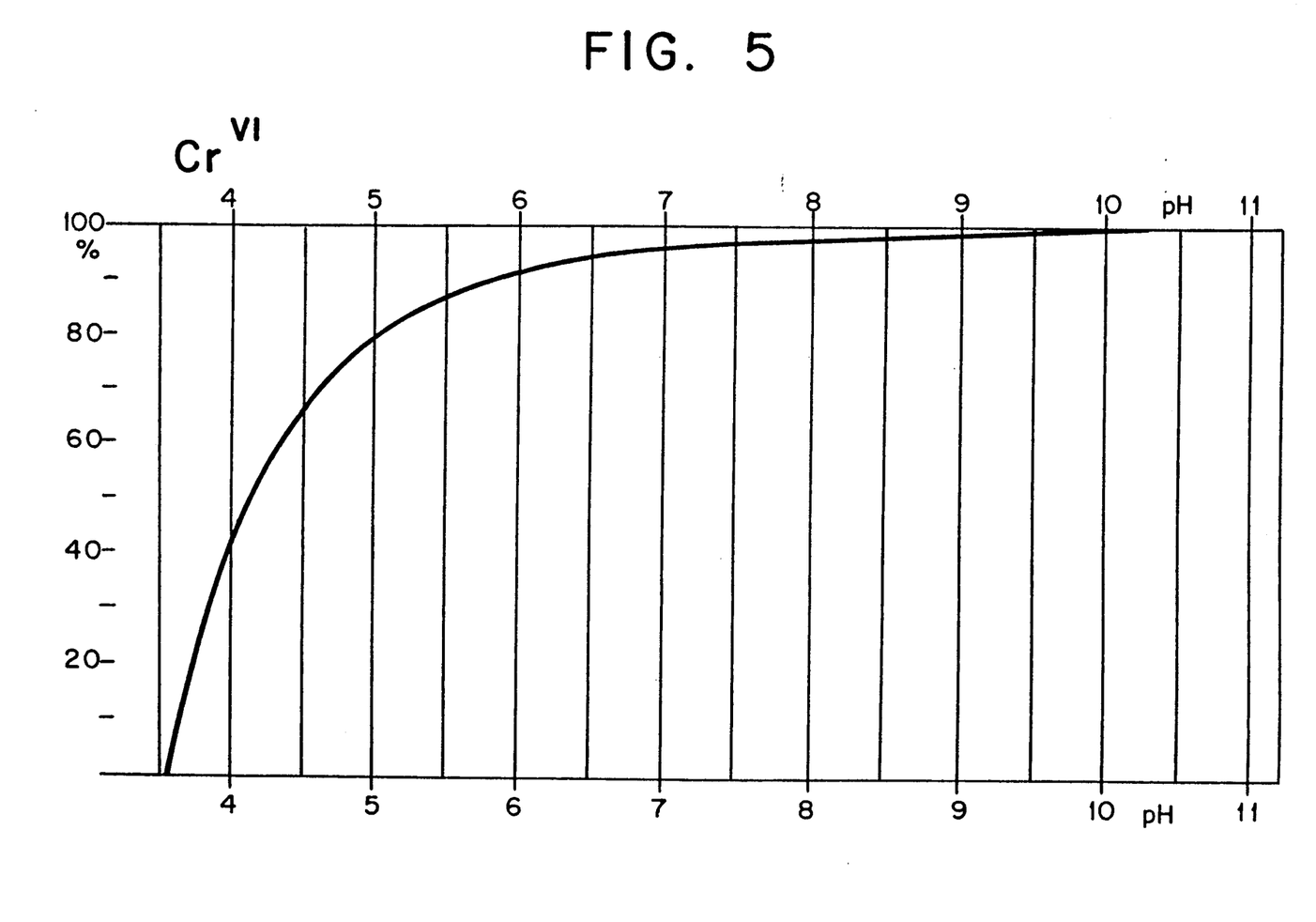
Figure 6:
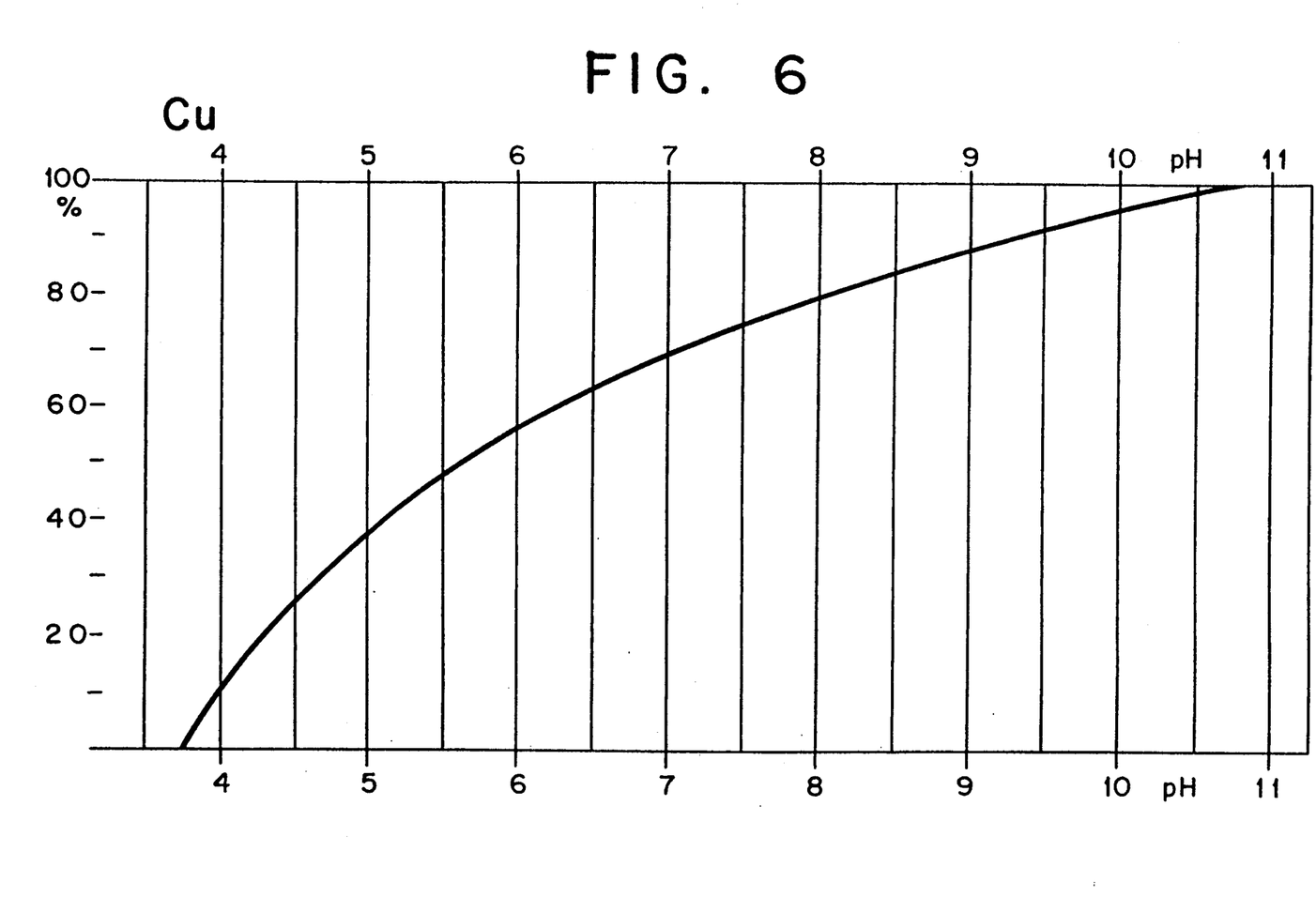
Figure 7:
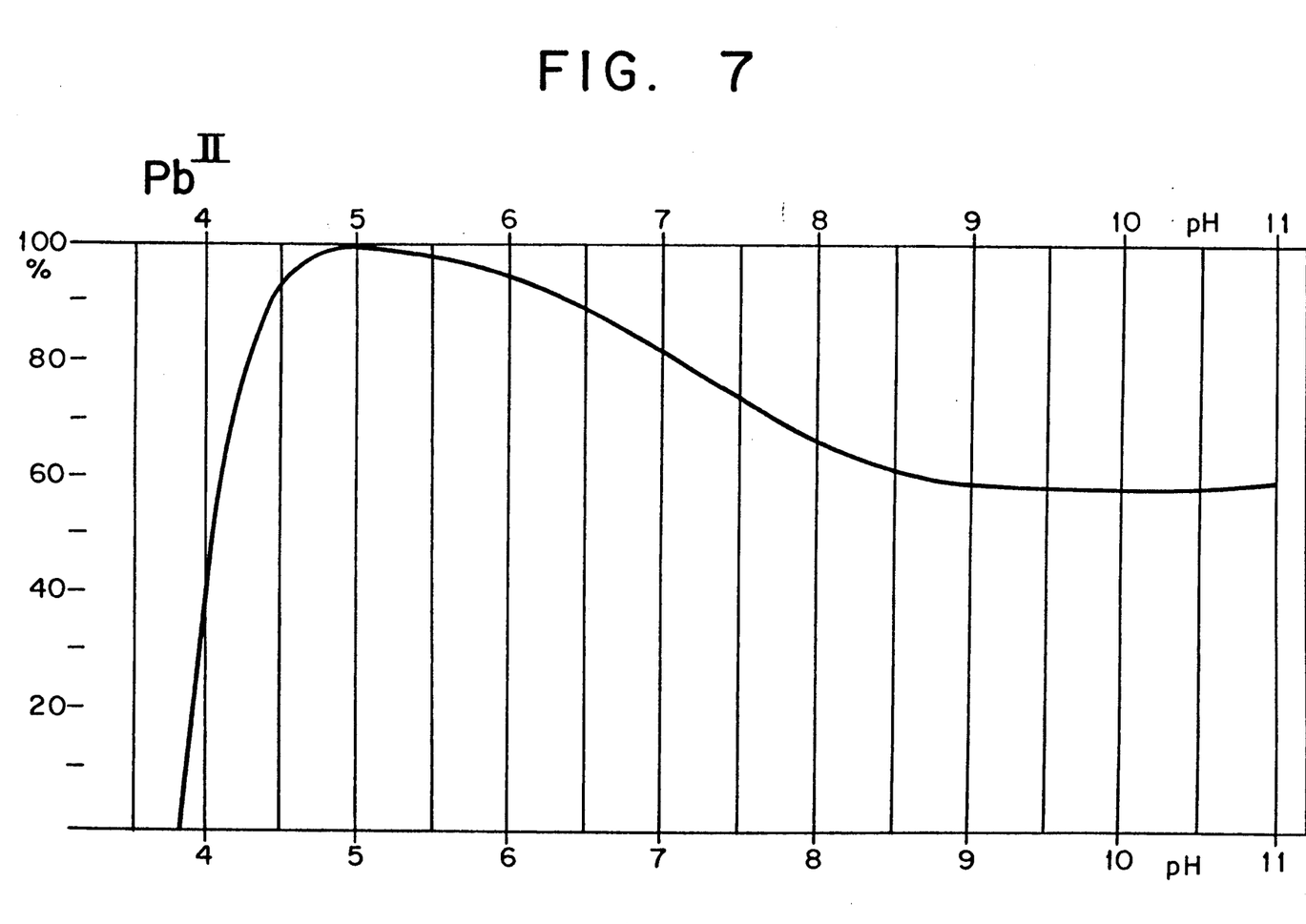
Figure 8:
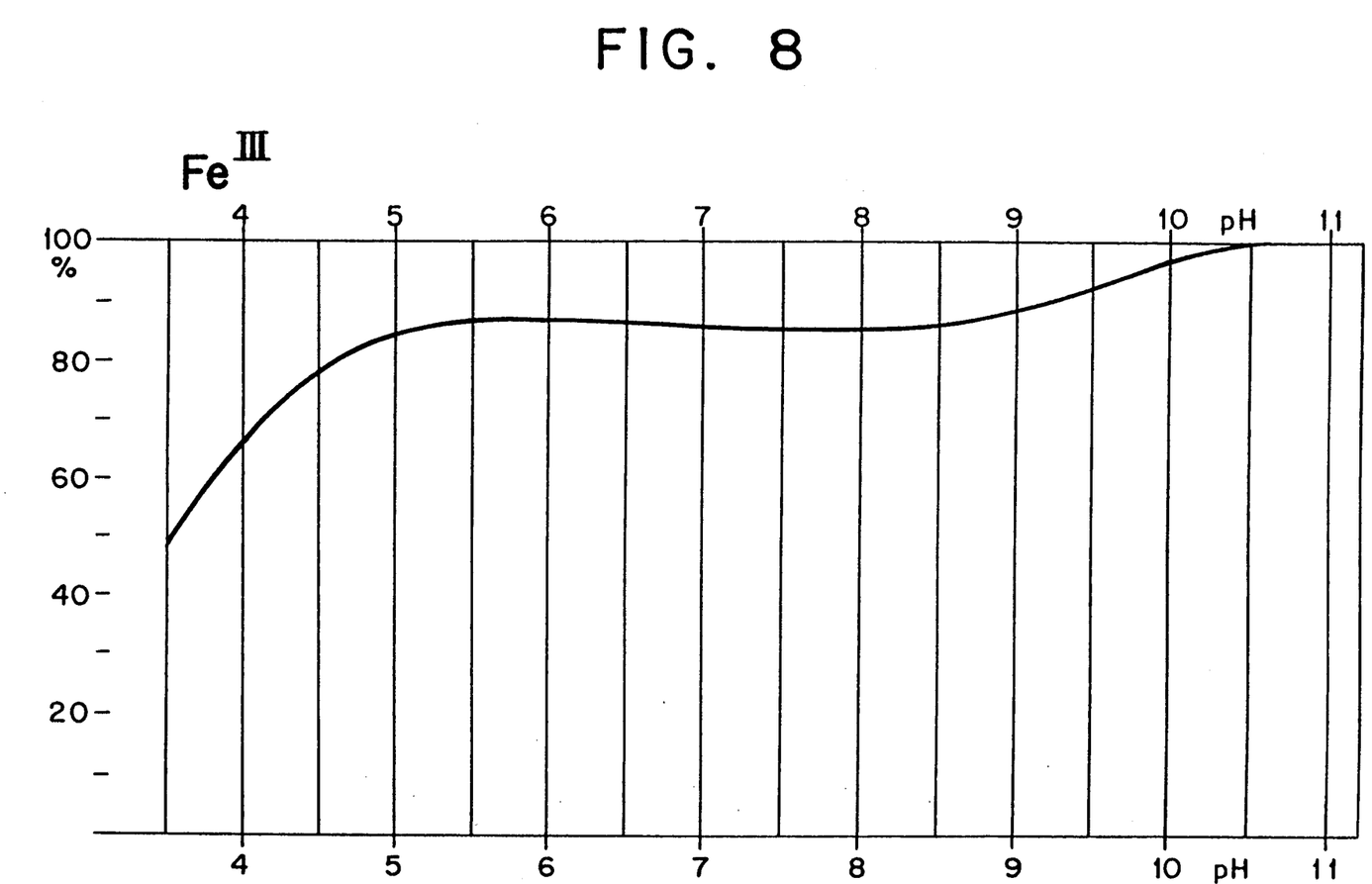
Figure 9:
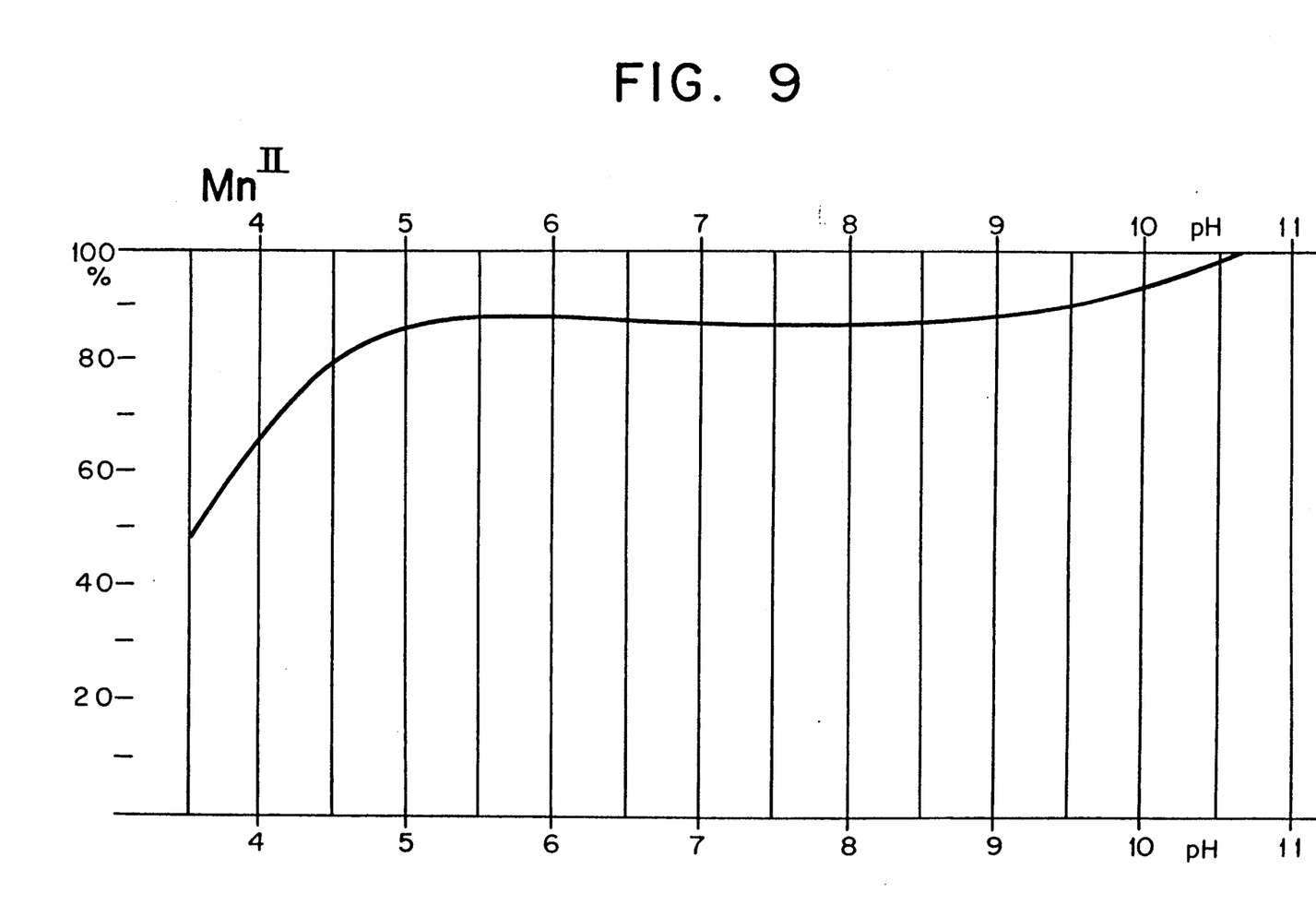
Figure 10:
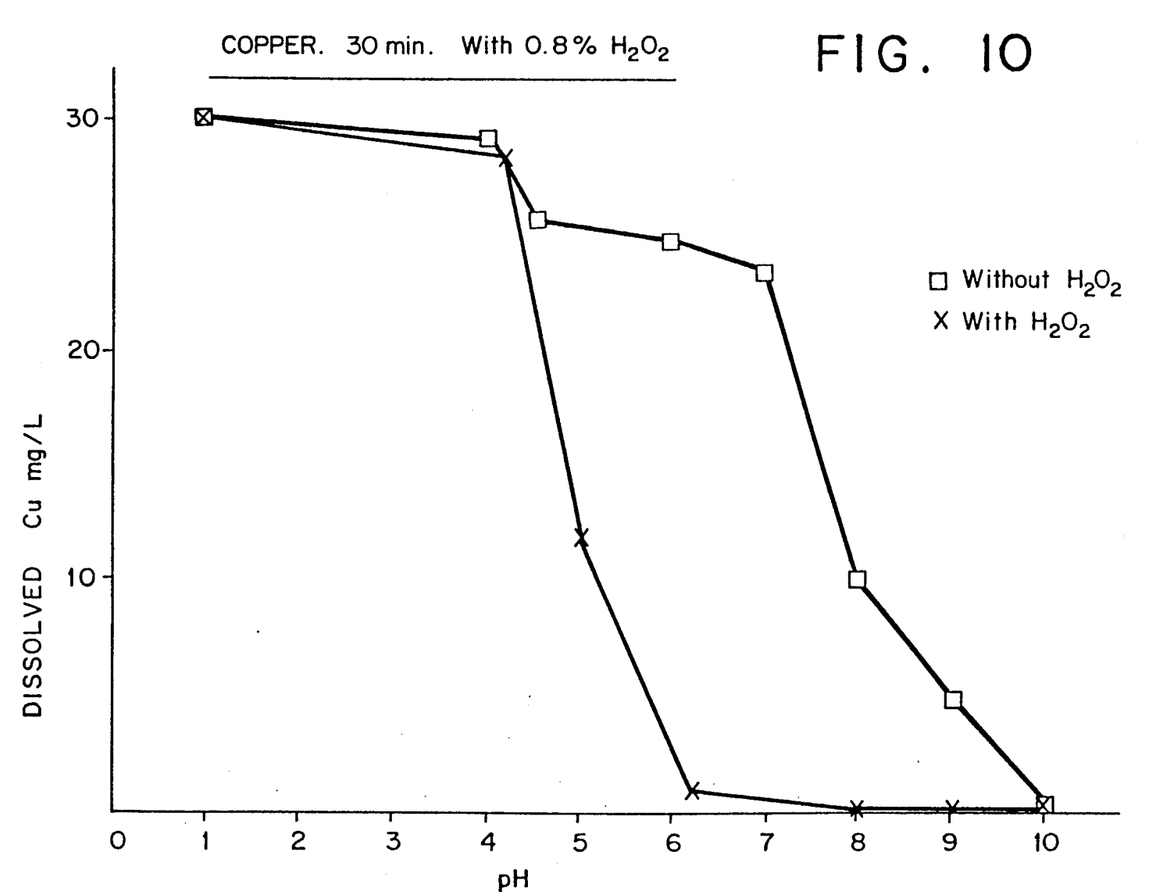
FIGS. 10 and 11 show the precipitation behaviour of copper and manganese (130 mg manganese/l) after vigorous oxidation.

FIG. 10 shows the associated precipitation curves.

EXAMPLE 6

A model sample with 130 mg/l manganese in the form of $MnCl_2$ is treated for 30 min. with 0.8% hydrogen peroxide.

The higher concentration and more vigorous oxidation compared with Example 1 brings about a completely different precipitation behaviour.

| Amounts of manganese still in solution at | |
|---|---|
| pH 6 | 117 mg/l |
| pH 8 | 10 mg/l |
| pH 9 | 1 mg/l |

Figure 11:
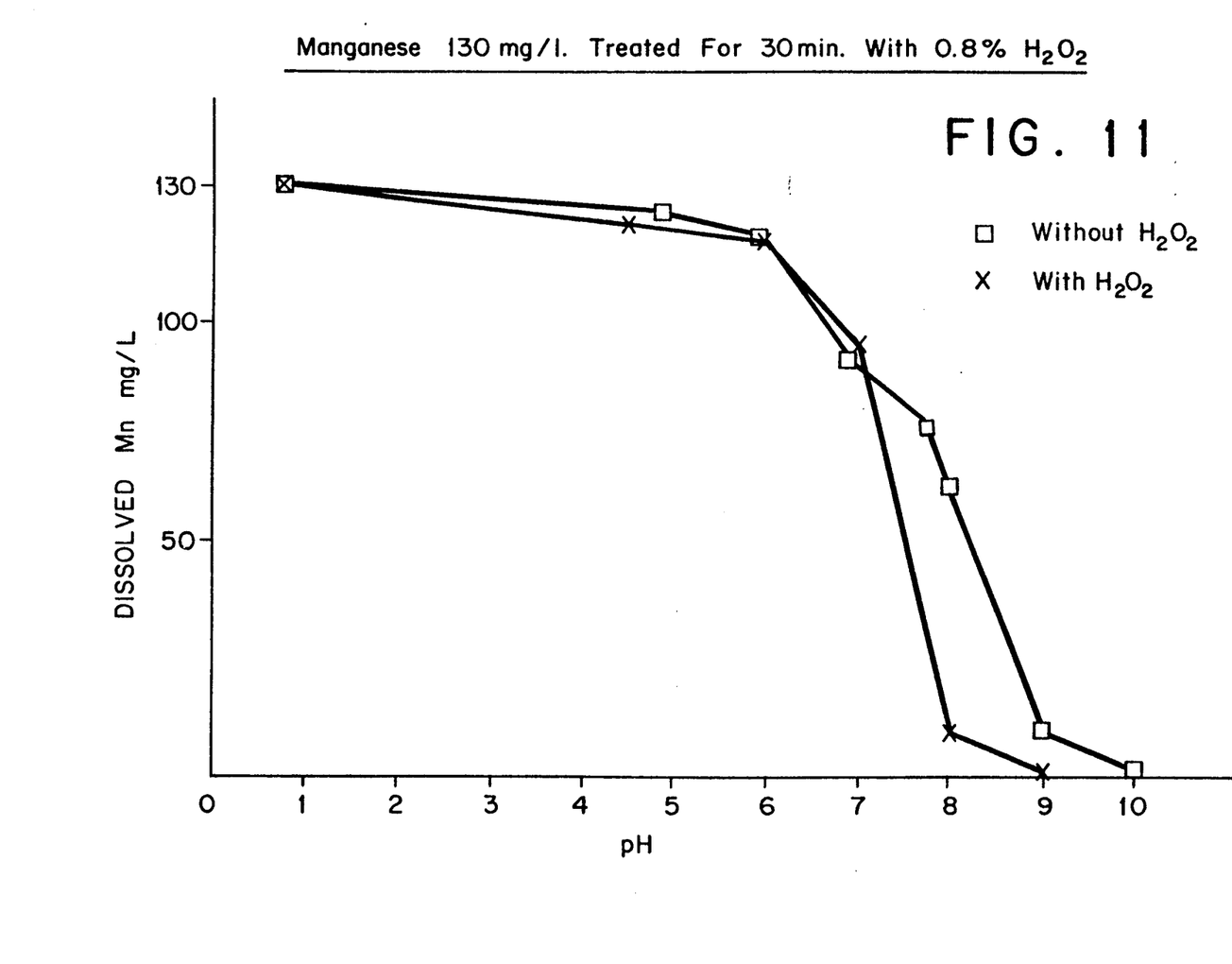

FIG. 11 shows the associated precipitation curves.

The examples are not exhaustive and give only a few specific possibilities for the process of the present invention. By means of fractionations other than those selected in the examples, it will be appreciated by those skilled in the art that at different pH values, the heavy-metal compositions of the fractions can be varied and largely adapted to the requirements of the users. In some cases, it may be sufficient to precipitate the heavy metals in their totality, after the almost complete separation of the iron/manganese fraction, at pH 10-11 and to pass them on for further use.

The process of the present invention advantageously avoids the storage of the heavy-metal residues obtained during the decontamination at disposal sites. Thus, there are no disposal site costs. On the contrary, the various metal fractions are valuable raw materials. The readily decomposable form of the hydroxides and carbonates obtained with the process according to the present invention is also an advantage compared with natural ores.

Thus, in accordance with the process of the present invention, it is possible by selective precipitation in particular pH ranges to separate individual metals and groups of metals quantitatively from each. For example, it is possible, after weak oxidation, by repeated precipitation, re-acidification and re-precipitation at pH 3.5 to isolate iron and manganese as a fraction almost quantitatively from the other heavy metals. This is an important step for practical purposes. The iron, which is of no use and is a problem in the recycling of the heavy metals, is eliminated and made available for use in the metallurgical industry in the form of a valuable, readily decomposable quasi-manganese ore with 3 to 6% manganese, and possibly higher according to the source.

I claim:

1. A process for the removal of heavy-metals from a contaminated waste material including lead and having at least a first heavy-metal and a second heavy-metal comprising the steps of:
   treating the waste material with an acid to dissolve the heavy metals as water-soluble salts;
   treating the water-soluble salts with an oxidizing agent;
   forming a hydroxide of at least the first heavy-metal;
   precipitating at least a portion of the first heavy-metal as a hydroxide at a first pH of below about 5;
   adjusting the pH to a second pH which is different from the first pH; and
   precipitating at least a portion of the second heavy-metal as a hydroxide at the second pH.

2. A process according to claim 1 wherein the first heavy-metal comprises iron and the first pH is about 3.5.

3. A process according to claim 2 wherein manganese is precipitated with the first heavy-metal.

4. A process according to claim 1 wherein the acid is a mineral acid.

5. A process according to claim 1 wherein the oxidizing agent comprises air.

6. A process according to claim 1 wherein the oxidizing agent comprises hydrogen peroxide.

7. A process according to claim 1 wherein at least one of the precipitation steps is repeated by re-treating the water-soluble salts with an acid and repeating the hydroxide forming step.

8. A process according to claim 1 wherein a lead fraction is separated at a pH of about 5.

9. A process according to claim 1 wherein a nickel/chromium/cobalt/copper fraction is separated at a pH of about 7.

10. A process according to claim 1 wherein a copper/lead fraction is precipitated at a pH of about 4.5-6.5 after vigorous oxidation effective to precipitate said fraction.

11. A process according to claim 1 wherein a nickel/chromium/cobalt fraction is separated at a pH of about 7 after vigorous oxidation effective to precipitate said fraction.

12. A process according to claim 1 wherein a manganese fraction in a concentration of greater than 70 mg/l, is precipitated at a pH of at least about 8 after vigorous oxidation effective to precipitate said fraction.

13. A process according to claim 1 wherein at least one of the precipitated hydroxides is converted into a metal carbonate by treatment with carbon dioxide.

14. A process according to claim 13 wherein the conversion is performed at a pH of about 9-11.

15. A process for the removal of heavy-metals from a contaminated waste material including lead and having at least a first heavy-metal and a second heavy-metal comprising the steps of:
   treating the waste material with an acid to form metal salts;
   oxidizing the metal salts;
   forming a hydroxide of at least the first heavy-metal;
   precipitating at least a portion of the first heavy-metal as a hydroxide at a first pH of below about 5;
   adjusting the p to a second pH which is different from the first pH; and
   precipitating at least a portion of the second heavy-metal as a hydroxide at the second pH.

16. A process according to claim 15 wherein the oxidizing step is performed with air.

17. A process according to claim 15 wherein the oxidizing step is performed with hydrogen peroxide.

18. A process according to claim 15 wherein the acid is a mineral acid.

19. A process according to claim 15 wherein at least one of said precipitated hydroxides is converted into a metal carbonate by treatment with carbon dioxide.

20. A process for the removal of heavy-metals from a contaminated waste material having at least a first heavy-metal fraction comprising lead and a second heavy-metal fraction comprising the steps of:
- treating the waste material with an acid to dissolve the heavy metals as water-soluble salts;
- forming a hydroxide of at least the first heavy-metal;
- precipitating at least a portion of the first heavy-metal fraction as a hydroxide at a first pH of below about 5;
- adjusting the pH to a second pH which is different from the first pH; and
- precipitating at least a portion of the second heavy-metal as a hydroxide at the second pH.

21. A process for the removal of heavy-metals from a contaminated waste material having at least a first copper/lead fraction and a second heavy-metal fraction comprising the steps of:
- treating the waste material with an acid to dissolve the heavy-metals as water-soluble salts;
- forming a hydroxide of at least the copper/lead fraction;
- precipitating at least a portion of said copper/lead fraction as a hydroxide at a first pH of about 4.5 to about 6.5;
- adjusting the pH to a second pH which is different from said first pH;
- and precipitating at least a portion of said second heavy-metal as a hydroxide at second pH.

* * * * *

UNITED STATES PATENT AND TRADEMARK OFFICE
CERTIFICATE OF CORRECTION

PATENT NO. : 5,009,793

DATED : April 23, 1991

INVENTOR(S) : German Muller

It is certified that error appears in the above-identified patent and that said Letters Patent is hereby corrected as shown below:

Column 2, Line 53, after "peroxide", insert --.--

Column 6, Line 54, after "the", change "p" to --pH--

Signed and Sealed this

Fifteenth Day of September, 1992

Attest:

DOUGLAS B. COMER

*Attesting Officer*   *Acting Commissioner of Patents and Trademarks*